United States Patent [19]

Chang

[11] Patent Number: 4,588,802

[45] Date of Patent: May 13, 1986

[54] POLYURETHANES BASED ON POLYETHER BLENDS

[75] Inventor: Eugene Y. C. Chang, Bridgewater, N.J.

[73] Assignee: American Cyanamid Company, Stamford, Conn.

[21] Appl. No.: 638,594

[22] Filed: Aug. 9, 1984

[51] Int. Cl.$^4$ .................. C08G 18/24; C08G 18/48; C08G 18/76

[52] U.S. Cl. ...................... 528/58; 521/914; 528/44; 528/77; 252/182

[58] Field of Search ............... 528/44, 58, 77; 521/914

[56] References Cited

U.S. PATENT DOCUMENTS

| | | | |
|---|---|---|---|
| 3,290,350 | 12/1966 | Hoover | 260/453 |
| 3,549,596 | 12/1970 | McMillin et al. | 528/44 |
| 3,963,681 | 6/1976 | Kaneko et al. | 260/77.5 AM |
| 4,242,463 | 12/1980 | Sanok et al. | 521/51 |
| 4,243,760 | 1/1981 | McDaniel et al. | 521/914 |
| 4,341,875 | 7/1982 | Visger et al. | 521/164 |
| 4,350,778 | 9/1982 | Dominguez et al. | 521/128 |
| 4,350,779 | 9/1982 | Dominguez et al. | 521/126 |
| 4,438,248 | 3/1984 | Christman et al. | 528/57 |
| 4,439,616 | 3/1984 | Singh et al. | 560/25 |
| 4,440,705 | 4/1984 | Nissen et al. | 521/914 |

*Primary Examiner*—Herbert S. Cockeram
*Attorney, Agent, or Firm*—John W. Cornell; Henry C. Jeanette

[57] ABSTRACT

Polyurethane compositions based on aliphatic diisocyanates, or prepolymers of aliphatic diisocyanates, and blends of ethylene oxide capped polypropylene glycol polyethers of at least tri-functionality with ethylene oxide capped polypropylene glycol polyethers of di-functionality are disclosed. Suitable aliphatic diisocyanates comprise tertiary aralkyl isocyanates with a preferred isocyanate being para-tetramethylxylene diisocyanate (p-TMXDI). The compositions disclosed include reaction injection molding compositions.

4 Claims, No Drawings

POLYURETHANES BASED ON POLYETHER BLENDS

FIELD

This invention relates to polyurethanes formed—in particular by reaction injection molding (RIM)—from alphatic diisocyanates, or prepolymers thereof, and blends of polyethers.

BACKGROUND

Polypropylene glycols (PPG), especially ethylene oxide (EO) capped PPG's, are the most commonly used polyether soft segment in RIM processing. The EO capping provides primary hydroxyl groups on the PPG, which (if uncapped) contains basically secondary hydroxyl groups. Capping thereby increases the reactivity of the parent PPG. High reactivity is a prerequisite in a RIM process.

A RIM composition (like polyurethane elastomers in general) is composed of a soft segment (derived from the aforementioned polyether) and a hard segment resulting from the reaction of a chain extender (usually a low molecular weight diol or polyol such as 1,4-butanediol, ethylene glycol, etc.) and the diisocyanate. The concentration of the hard segment governs the hardness of the final product. At a given hardness, each individual component has an effect on the overall properties, such as tensile strength, elongation at break, weatherability, etc.

There are many grades of PPG in the market, differing in functionality, molecular weight (or equivalent weight), degree of EO capping, etc. Each one may show some difference in RIM processing behavior as well as physical properties in the final product. A polyether having an equivalent weight (eq. wt.) of 1000 or higher usually gives good molding characteristics.

U.S. Pat. No. 3,963,681 discloses a polyurethane elastomer composition having improved static mechanical properties made from a polyfunctional isocyanate, curing agent and polyether. The weight average molecular weight of the polyether is within the range of 1,000 to less than 4,500. Also, the molecular weight distribution curve of the polyether has at least two peaks. At least one peak is located in the higher molecular weight region and at least another one is located in the lower molecular weight region relative to the rheological critical molecular weight of the polyether. According to the patent, to obtain the improved properties of the compositions, one of the essential factors is the use of polyethers having the particular molecular weight range described (see, for example, the paragraph bridging Columns 3 and 4, and paragraphs 1 to 3 of Column 4).

U.S. Pat. No. 4,242,463 relates to a color stable integral skin polyurethane foam. The polyurethane is prepared by reacting: (a) a polyol; (b) an isocyanate selected from the group consisting of aliphatic or cycloaliphatic isocyanates; (c) a crosslinker; and (d) a catalyst comprising stannous octoate and dimethyltin dilaurate. It is disclosed that the polyol used should be selected from the group consisting of polyether polyols which are polymer products of organic oxides. The two organic oxides used for most polyether polyols are ethylene oxide and propylene oxide. Among the examples of chain extenders disclosed is 1,4-butanediol.

U.S. Pat. No. 4,261,877 discloses a polyurethane composition, castings of which reportedly have high strength. The composition results from the reaction of a polyisocyanate with a blend of polyether polyols. A major portion of the blend comprises polyether polyols selected from the group consisting of those having a hydroxy number of 400 to 1000 and a functionality of 3–4. A portion of the blend, effective to improve substantially the strength of the blend, comprises a graft polyol which is liquid and pourable at ambient temperature. The graft polyol is a product of the free-radical-catalyzed polymerization of at least one ethylenically unsaturated monomer with a polyol which contains carbon-carbon unsaturation and oxyalkylene moieties and which has an average molecular weight on the order of 300 to 10,000.

U.S. Pat. No. 4,350,778 discloses a method for making a polyurethane elastomer reportedly having significantly improved properties. In the method an aromatic polyisocyanate, a polyol of above about 500 equivalent weight, a chain extending agent and a catalyst system is injected via a RIM machine into a mold cavity of the desired configuration. The chain extending agent comprises a low molecular weight active hydrogen containing compound of at least 2 functionality. The catalyst system is N-hydroxypropyl-N', N', N'', N''-tetramethyliminobispropylamine, dibutyltin dilaurate and an alkyltin mercaptide. The polyols which are useful include polyether polyols, polyester diols, triols, tetrols, etc., having an equivalent weight of at least 500, and preferably at least 1000 up to about 3000.

U.S. Pat. No. 4,350,779 discloses a method for making a polyurethane elastomer reportedly having significantly improved properties. In the method an aromatic polyisocyanate, a polyol of above about 500 equivalent weight, a chain extending agent and a catalyst system is injected via a RIM machine into a mold cavity of the desired configuration. The chain extending agent comprises a low molecular weight active hydrogen containing compound of at least 2 functionality. The catalyst system is methyldiethanolamine, dibutyltin dilaurate and an alkyltin mercaptide. The polyols which are useful include polyether polyols, polyester diols, triols, tetrols, etc., having an equivalent weight of at least 500, and preferably at least 1000 up to about 3000.

U.S. Pat. No. 4,440,705 relates to the preparation of cellular and non-cellular polyurethane elastomers. In particular, this patent relates to the use of polyoxyalkylene polyether polyols containing an ethoxylation degree of 1 through 13 and a primary hydroxy group content of up to 100 percent for the preparation of polyurethane elastomers.

U.S. Pat. No. 4,438,248 discloses a process for preparing a non-cellular polyurethane elastomer. The process comprises reacting, in the absence of a blowing agent, an organic polyisocyanate with an organic compound having at least two Zerewitinoff active hydrogen atoms in a ratio of from 1.0 to 1.2 equivalents of isocyanate groups per equivalent of active hydrogen atoms in the presence of a catalytically effective amount of a co-catalyst composition. The co-catalyst composition comprises an organo-mercuric compound and an alkali metal carboxylic acid salt. The co-catalyst composition components are in a weight ratio of from 1 to 5 parts organo-mercuric compound per part of alkali metal carboxylic acid salt.

A welcome contribution to the art would be a polyurethane composition which does not require multi-component catalyst systems or grafted polyols to produce such a composition with good tensile and elongation properties. Preferably, such a composition would be suitable for a RIM process. Such a contribution is provided for by this invention.

SUMMARY OF THE INVENTION

This invention provides a polyurethane composition based on an aliphatic diisocyanate and a blend of polypropylene glycol (PPG) polyethers. The PPG polyethers comprise an ethylene oxide (EO) capped PPG polyether of at least tri-functionality or mixtures thereof, and an EO capped PPG polyether of di-functionality or mixtures thereof. Suitable aliphatic diisocyanate include tertiary aralkyl isocyanates such as para-tetramethylxylene diisocyanate (p-TMXDI).

DETAILED DESCRIPTION OF THE INVENTION

This invention provides a polyurethane composition comprising the reaction product of:

(A) an ethylene oxide capped polypropylene glycol polyether of at least tri-functionality, or mixtures thereof;

(B) an ethylene oxide capped polypropylene glycol polyether of di-functionality, or mixtures thereof;

(C) an aliphatic diisocyanate, or a polyurethane prepolymer having terminally reactive isocyanate groups and formed as a reaction product of a stoichiometric excess of an aliphatic diisocyanate with polymeric diol;

(D) a 1,4-butanediol chain extender; and (E) optionally, a catalytic amount of a catalyst.

Another embodiment of this invention provides a reaction injection molding composition comprising:

(A) an ethylene oxide capped polypropylene glycol polyether of at least tri-functionality, or mixtures thereof;

(B) an ethylene oxide capped polypropylene glycol polyether of di-functionality, or mixtures thereof;

(C) a tertiary aralkyl isocyanate represented by the formula:

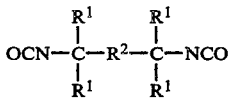

wherein $R^1$ is an alkyl radical having from 1 to 3 carbon atoms, and $R^2$ is an arylene radical having up to 12 carbon atoms, said arylene radical being unsubstituted or substituted with substituents selected from the group consisting of halogen, hydrocarbyl radicals, hydrocarbyloxy radicals and hydrocarbylcarboxy radicals; or a polyurethane prepolymer having terminally reactive isocyanate groups and formed as a reaction product of a stoichiometric excess of said isocyanate with (a) a polypropylene glycol polyether having at least tri-functionality, or mixtures thereof;

(b) a polypropylene glycol polyether having di-functionality, or mixtures thereof;

(c) an ethylene oxide capped polypropylene glycol polyether having at least tri-functionality, or mixtures thereof;

(d) an ethylene oxide capped polypropylene glycol polyether having di-functionality; or mixtures thereof;

(e) said polyether of (A);

(f) said polyether of (B); or (g) mixtures of (e) and (f);

(D) a 1,4-butanediol chain extender; and (E) a catalytic amount of a catalyst.

In still another embodiment of this invention there is provided a method of producing a polyurethane composition comprising the steps of:

(A) blending an ethylene oxide capped polypropylene glycol polyether of at least tri-functionality, or mixtures thereof; with (B) an ethylene oxide capped polypropylene glycol polyether of di-functionality, or mixtures thereof; and reacting said blend of (A) and (B) with (C) an aliphatic diisocyanate, or a polyurethane prepolymer having terminally reactive isocyanate groups and formed as a reaction product of a stoichiometric excess of aliphatic diisocyanate with polymeric diol; and (D) a 1,4-butanediol chain extender; in the presence of (E) optionally, a catalytic amount of a catalyst.

Yet another embodiment of this invention provides a method of producing a reaction injection molding composition comprising the steps of:

(A) blending an ethylene oxide capped polypropylene glycol polyether of at least tri-functionality, or mixtures thereof; with (B) an ethylene oxide capped polypropylene glycol polyether of di-functionality, or mixtures thereof; and reacting said blend of (A) and (B) with (C) A tertiary aralkyl isocyanate represented by the formula:

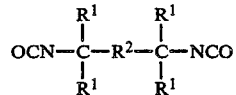

wherein $R^1$ is an alkyl radical having from 1 to 3 carbon atoms, and $R^2$ is an arylene radical having up to 12 carbon atoms, said arylene radical being unsubstituted or substituted with substituents selected from the group consisting of halogen, hydrocarbyl radicals, hydrocarbyloxy radicals and hydrocarbylcarboxy radicals; or a polyurethane prepolymer having terminally reactive isocyanate groups and formed as a reaction product of a stoichiometric excess of said isocyanate with (a) a polypropylene glycol polyether having at least tri-functionality, or mixtures thereof;

(b) a polypropylene glycol polyether having di-functionality, or mixtures thereof;

(c) an ethylene oxide capped polypropylene glycol polyether having at least tri-functionality, or mixtures thereof;

(d) an ethylene oxide capped polypropylene glycol polyether having di-functionality; or mixtures thereof;

(e) said polyether of (A);

(f) said polyether of (B); or (g) mixtures of (e) and (f); and (D) a 1,4-butanediol chain extender; in the presence of (E) a catalytic amount of a catalyst.

The EO capped PPG polyethers of this invention having at least a tri-functionality usually have a number average equivalent weight of about 400 to about 4000 with about 1000 to 3000 being preferred. In general, a functionality of 3 to about 5 or mixtures thereof is used with a functionality of 3 being preferred. Usually the PPGs of at least tri-functionality have a hydroxyl number (OH#) of about 14 to about 140 with about 19 to about 56 being preferred.

The EO capped PPG polyether of di-functionality usually have a number average equivalent weight of about 300 to about 4000 with about 400 to about 3000 being preferred. Generally, the di-functionality PPGs have a hydroxyl number (OH#) of about 13 to about 190 with about 19 to about 140 being preferred.

These EO capped PPG polyethers are known in the art and are commercially available. Non-limiting examples of such polyethers are set forth in the examples hereinafter.

The ratio of polyether (A) to polyether (B) is generally in the range of about 80 to 20 to about 20 to 80 with about 70:30 to about 30:70 being preferred. This ratio is based on 100 as the total parts of polyether (A) and polyether (B). The ratio also includes the parts of polyether (A) and/or polyether (B), if any, which is utilized in forming the polyurethane prepolymer of (C). Those skilled in the art will appreciate that the actual optimum properties with any given pair of polyethers (A) and (B) will be found at a ratio characteristic of that particular pair. The optimum for any desired property of the polyurethane, such as the tensile strength, is readily determined by those skilled in the art without undue experimentation.

In general, aliphatic diisocyanates known in the art are utilizable. Potentially useful aliphatic diisocyanates may include for example, alkylene diisocyanates with 4 to 12 carbon atoms in the alkylene radical such as 1,12-dodecane diisocyanate, 1,4-tetramethylene diisocyanate and 1,6-hexamethylene diisocyanate; cycloaliphatic diisocyanates such as 1,3- and 1,4-cyclohexane diisocyanate as well as any desired mixture of these isomers, 1-isocyanato-3,3,5-trimethyl-5-isocyanatomethylcyclohexane (isophorone diisocyanate), 2,4- and 2,6-hexahydrotoluenediisocyanate as well as the corresponding isomer mixtures, 4,4'-, 2,2'- and 2,4'-dicyclohexylmethane diisocyanate as well as the corresponding isomer mixtures, and the like.

Particularly useful in the broad practice of the present invention are tertiary aralkyl isocyanates represented by the following formula:

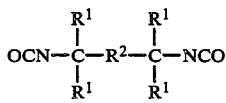

wherein $R^1$ is an alkyl radical having from 1 to 3 carbon atoms with $R^1$ having 1 carbon atom—i.e., a methyl radical—being preferred, and $R^2$ is an arylene radical having up to 12 carbon atoms, said arylene radical being unsubstituted or substituted with substituents selected from the group consisting of halogen, hydrocarbyl radicals, hydrocarbyloxy radicals and hydrocarbycarboxy radicals, with phenyl, biphenyl and napthalyl being preferred, and phenyl being most preferred. These tertiary aralkyl isocyanates are described in U.S. Pat. No. 3,290,350 and U.S. Pat. No. 4,439,616, the disclosures of which are incorporated herein by reference.

A most preferred tertiary aralkyl isocyanate is (p-TMXDI). The chemical formula of p-TMXDI is:

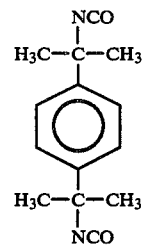

The p-TXMDI may be prepared by methods known in the art, see for example, U.S. Pat. Nos. 4,361,518, 4,379,767, and U.S. Pat. No. 4,399,074, the disclosures of which are incorporated herein by reference.

As stated above, a polyurethane prepolymer can be used as the isocyanate component in the polyurethane composition. The polyurethane prepolymer having terminally reactive isocyanate groups is formed as a reaction product of polymeric diol with a stoichiometric excess of aliphatic diisocyanate. Suitably, the aliphatic diisocyanate is a tertiary aralkyl isocyanate as defined above and preferably the diisocyanate is p-TMXDI. Preferably, the polymeric diol is a PPG polyether of di-functionality, or a polyol which is a PPG polyether of tri-functionality, or a mixture thereof. These PPG polyethers can be the same or different as the PPG polyethers of (A) or (B), but without being capped with EO. Most preferably, the polymeric diol is the same as the PPG polyether of (A) or of the PPG polyether of (B), or mixtures thereof. In preparing the prepolymer using PPG polyethers (either EO capped or non-capped), PPG polyethers having a number average equvalent weight of about 200 to about 4000 can be used, with about 400 to about 3000 being preferred. Using a PPG polyether with a functionality higher than 3 for the prepolymer preparation is not advisable, as the prepolymers would become too viscous. However, PPG polyethers with a functionality higher than 3 could be used for the prepolymers as a small portion of a mixture (less than about 10 wt %, based on the weight of all polymeric polyols used to prepare the prepolymers) if desired.

However, in general, the polymeric diols known in the art for preparing polyurethane compositions can be used to prepare the prepolymer. The term "polymeric diol" as used herein includes mixtures of compatible diols, e.g., mixtures of polyether diols, mixtures of polyester diols, and compatible mixtures of polyether diols and polyester diols. Those skilled in the art will appreciate that the term "compatible" means the diols are mutually soluble in each other so as to form a single phase.

The polyether and polyester diols normally used in the preparation of polyurethane elastomers—e.g., hydroxyl-terminated—can be employed as the polymeric diols in preparing the prepolymers. Representative diols are polyalkylene ether glycols such as polyethylene ether glycol, polypropylene ether glycol and poly (tetramethylene ether) glycol and the polyethers prepared by the copolymerization of cyclic ethers such as ethylene oxide, propylene oxide, trimethylene oxide, and tetrahydrofuran with aliphatic diols such as ethylene glycol, 1,3-butanediol, 1,4-butanediol, diethylene glycol, dipropylene glycol, 1,2-propylene glycol, and 1,3-propylene glycol. Mixtures of polyethers, for example, a mixture of polytetramethylene ether glycol and polypropylene- polyethylene oxide ether glycol, may be used.

Suitable hydroxyl-terminated polyesters useful herein include, but are not limited to, polyethylene adipate, polypropylene adipate, poly(ethylene-propylene) adipate, polybutylene adipate, polyhexamethylene adipate, and the like, and the copolyesters prepared by copolymerizing ethylene glycol and propylene glycol with the foregoing polyesters during their preparation—such as, for example, poly(1,4-butylene-ethylene) adipate, poly(1,4-butylene-propylene) adipate, and poly(1,4-butylene-ethylene-propylene) adipate. Other hydroxyl-terminated polyesters are well recognized as useful in polyurethane technology and include those derived from the polymerization of caprolactones and from the condensation of dicarboxylic acids such as succinic, malonic, pimelic, sebacic and suberic acids among others with diols such as ethylene glycol, 1,2-propanediol, 1,3-propanediol, 2,2-dimethyl-1,3-propanediol, 1,4-butanediol, 1,5-pentanediol, 1,6-hexanediol, and the like. Mixtures of polyesters may also be used.

Polymeric diols having a number average molecular weight of at least about 300 may be used. Generally, the molecular weights used range from about 300 to about 600. A range of about 400 to about 3000 is preferred with about 1000 to about 3000 being most preferred.

Any polyether having a number average molecular weight within the range specified above may be used. However, in general, polyethers are used having a number average molecular weight within the range of from about 445 to about 2100. Products within this range are commercially available. Preferably, the number average molecular weight is within the range of from about 800 to about 2000.

Any polyester having a number average molecular weight within the range specified above for polymeric diols may be used. However, in general, polyesters are used having a number average molecular weight within the range of from about 300 to about 3500, with about 400–3000 being preferred and about 1000 to about 3000 being most preferred.

By well-known methods in the art a stoichiometric excess, as stated above, of diisocyanate is reacted with polymeric diol to form the prepolymer. Generally, the ratio of equivalents of —NCO groups in the diisocyanate to —OH groups in the polymeric diol is from about 2:1 to about 5:1 with about 2.5:1 to about 4.5:1 being preferred and about 3.0:1 to about 3.5:1 being most preferred.

The prepolymers from which the polyurethanes are prepared have an isocyanate content (% NCO) of at least about 2 wt %, based on the weight of the prepolymer. Usually the isocyanate content is within the range of from about 2.0 to about 9.0 wt %, with about 4.0 to about 7.5 wt % being preferred, and from about 4.5 to about 7.0 wt % being more preferred. The % NCO is related to the hardness of the final polyurethane, and may vary depending on the hardness desired.

During prepolymer preparations, benzoyl chloride may optionally be added in amounts from about 0.005 to about 0.1 percent by weight based on the weight of the prepolymer. Those skilled in the art will appreciate that the benzoyl chloride may be employed to keep the prepolymer slightly acidic as may be necessary or desirable in a given application for reasons of processing or obtaining specific prepolymer characteristics.

The chain extender used should be soluble in the processing system utilized. The preferred chain extender, particularly for a RIM process, is 1,4-butanediol. However, other known in the art chain extenders may prove useful. Thus, other potentially useful chain extenders may be found among those disclosed in U.S. Pat. No. 4,440,705, the disclosure of which is incorporated herein by reference. The chain extender is used in an amount which will vary depending on the hardness and other properties desired in the finished polyurethane. For a given quantity of the polyols present (including such polyols as have already been prereacted to form isocyanate-capped prepolymers), and a given quantity of unreacted isocyanate groups present, the amount of chain extender to be used will be such as to provide the desired stoichiometric index as described hereinafter. For example, about 2 to about 20 parts of chain extender, typically about 2 to about 10 parts, will be used per 100 parts (by weight) of the polyols present, but as noted, this is not an independent variable if the desired hardness, the isocyanate content and the stoichiometric index are specified. This dependency is characteristic of polyurethane formulations in general, as those skilled in the art will appreciate, and is not a novel feature of the present invention.

The stoichiometric index is the ratio of equivalents of NCO in the isocyanate component of the polyurethane formulation to equivalents of OH available to react with it in the hydroxyl component or components of the polyurethane formulation. Total equivalents of OH for this purpose includes OH groups derived from the polymeric diols, such as the PPG polyethers, as well as the chain extender (1,4-butanediol, for example). The stoichiometric index is another concept familiar to those skilled in the art. In the present invention, the preferred index is from about 0.95 to about 1.15, with an index from about 1.0 to about 1.1 being particularly preferred.

Those skilled in the art can appreciate that the presence of a catalyst is optional depending on the type of polyurethane composition being prepared. For example, for polyurethane compositions of this invention prepared by a RIM process a catalyst, preferably dimethyltin dilaurate, is used. Other representative catalysts which are expected to be useful in the polyurethane compositions of this invention include, but are not limited to: organic metal compounds, preferably organic tin compounds such as tin-(II)-salts of organic carboxylic acids, for instance, tin-(II)-acetate, tin-(II)-octoate, tin-(II)-ethylhexoate, tin-(II)-laurate, and the like, and the dialkyl tin-(IV)-salts of organic carboxylic acids such as dibutyltin diacetate, dibutyltin dilaurate, dibutyltin maleate and dioctyltin diacetate, and the like. The organic metal compounds are used alone or in combination with strongly basic amines. Examples include amidines such as 2,3-dimethyl-3,4,5,6-tetrahydropyrimidine, tertiary amines such as triethylamine, tributylamine, dimethylbenzylamine, N-methyl-, N-ethyl-, N-cyclohexylmorpholine, N,N,N',N'-tetramethylethylenediamine, N,N,N',N'-tetramethylbutanediamine, pentamethyldiethylenetriamine, tetramethyldiaminoethylether, bis(dimethylaminopropyl)urea, dimethylpiperazine, 1,2-dimethylimidazole, 1-azo-bicyclo[3.3.0]octane and 1,4-diaza-bicyclo[2.2.2]octane, and alkanol compounds such as triethanolamine, triisopropanolamine, N-methyl-and N-ethyl-diethanolamine and dimethylethanolamine, and the like. The catalyst, when present, is used in an amount from about 0.001 to about 5 wt % (of catalyst and/or catalyst combination), based on the total weight of the polyethers of (A) and the polyethers of (B), with about 0.01 to about 2 wt % being preferred.

The compositions of this invention can optionally contain known additives such as antioxidants, UV absorbers, hindered amine light stabilizers (HALS), pigments, fillers, flame retardants, and the like.

The following examples are provided for the purposes of illustration only. The examples should not be construed as limiting the invention in any way as variations of the invention are possible which do not depart from the spirit and scope of the appended claims.

EXPERIMENTAL PROCEDURE

In the examples that follow, hand-mix experiments were made to simulate RIM processing for the study. In actual RIM process every component in the composition would remain the same except that a higher level (2 to 5 times higher) of catalyst would be used to achieve a much faster reaction rate and shorter demold time.

Hand-mixing was done by using a high speed mixer stirrer to mix a polyol and catalyst mixture with p-TMXDI, both preheated to 75°–80° C., for 10–15 seconds. The mixture was then poured into a preheated mold at 80° C. and pressed for 5 minutes. The molded sample was left at room temperature for at least one day before testing for physical properties.

All examples are based on an isocyanate index of 1.05.

In the following examples the materials used are identified as follows:

TRIOLS

VORANOL ® 4702 brand of EO capped PPG triol polyether, from Dow Chemical Co., having a OH# of 33.6 (eq. wt.=1670)

VORANOL ® 5148 brand of EO capped PPG triol polyether, from Dow Chemical Co., having a OH# of 23.1 (eq. wt.=2430)

VORANOL ® 5815 brand of EO capped PPG triol polyether, from Dow Chemical Co., having a OH# of 28.3 (eq. wt.=1980)

XUS 14003.01 EO capped PPG triol polyether, from Dow Chemical Co., having a OH# of 34.3 (eq. wt.=1640)

DIOLS

XAS 10887.00 EO capped PPG diol polyether, from Dow Chemical Co., having a OH# of 57.2 (eq. wt.=980)

XAS 10887.01 EO capped PPG diol polyether, from Dow Chemical Co., having a OH# of 29.4 (eq. wt.=1910)

PLURACOL ® 628 brand of EO capped PPG diol polyether, from BASF Wyandotte Corp., having a OH# of 26.1 (eq. wt.=2150)

POLY G ® 55-112 brand of EO capped PPG diol polyether, from Olin Chemicals, having a OH# of 112.6 (eq. wt.=500)

CATALYST

FOMREZ ® UL-28 brand of dimethyltin dilaurate, from Witco Chemical Co.

In the tables that follow, "1,4-butanediol" is abbreviated as "BDO." The amounts given for the compositions are parts by weight.

In the tables that follow, the physical properties listed were determined by the following procedures.

Hardness, Shore A: ASTM 2240
Modulus, 100%, psi: ASTM D-412
Tensile Strength, psi: ASTM D-412
Elongation, %,: ASTM D-412
Tear Strength Die "C", lb/in: ASTM D-624

EXAMPLES 1–7

Table I, Examples 1–7, reports data showing the effect of different grades of polyols on physical properties of compositions not of this invention.

TABLE I

| | EFFECT OF GRADE OF POLYOL ON PROPERTIES | | | | | | |
|---|---|---|---|---|---|---|---|
| | Examples | | | | | | |
| Composition | 1 | 2 | 3 | 4 | 5 | 6 | 7 |
| VORANOL ® 4702 (triol) | 100 | — | — | — | — | — | — |
| VORANOL ® 5148 (triol) | — | 100 | — | — | — | — | — |
| VORANOL ® 5815 (triol) | — | — | 100 | — | — | — | — |
| XUS 14003.01 (triol) | — | — | — | 100 | — | — | — |
| XAS 10887.00 (diol) | — | — | — | — | 100 | — | — |
| XAS 10887.01 (diol) | — | — | — | — | — | 100 | — |
| PLURACOL ® 628 (diol) | — | — | — | — | — | — | 100 |
| BDO | 7 | 7 | 7 | 7 | 7 | 7 | 7 |
| p-TMXDI | 27.7 | 25.1 | 26.3 | 27.7 | 32.9 | 26.5 | 25.9 |
| FOMREZ ® UL-28 | 0.3 | 0.3 | 0.3 | 0.3 | 0.3 | 0.3 | 0.3 |
| Physical Properties | | | | | | | |
| Hardness A | 82 | 80 | 80 | 81 | 80 | 82 | 79 |
| Modulus, 100%, psi | 690 | 550 | 600 | 650 | — | — | — |
| Tensile Strength, psi | 1290 | 1430 | 1720 | 1280 | 500 | 360 | * |
| Elongation, % | 315 | 500 | 480 | 280 | 95 | 40 | — |
| Die "C" Tear Resistance lb/in | 250 | 330 | 330 | 240 | — | — | — |

*Too weak for testing

EXAMPLES 8–12

Table II, Examples 8–12, reports data demonstrating the effect of blending an EO capped PPG triol polyether with an EO capped PPG diol polyether.

TABLE II

| | EFFECT OF BLENDING OF POLYOLS | | | | |
|---|---|---|---|---|---|
| | Examples | | | | |
| Composition | 8 | 9 | 10 | 11 | 12 |
| XUS 14003.01 (triol) | 100 | 75 | 50 | 25 | 0 |
| PLURACOL ® 628 (diol) | 0 | 25 | 50 | 75 | 100 |
| BDO | 7 | 7 | 7 | 7 | 7 |
| p-TMXDI | 27.8 | 27.3 | 26.8 | 26.3 | 25.9 |
| FOMREZ ® UL-28 | 0.2 | 0.2 | 0.2 | 0.2 | 0.2 |

TABLE II-continued

EFFECT OF BLENDING OF POLYOLS

| Composition | Examples | | | | |
|---|---|---|---|---|---|
| | 8 | 9 | 10 | 11 | 12 |
| Physical Properties | | | | | |
| Hardness A | 84 | 83 | 84 | 83 | 79 |
| Modulus, 100%, psi | 720 | 640 | 660 | 620 | — |
| Tensile Strength, psi | 1355 | 1510 | 1600 | 740 | * |
| Elongation, % | 280 | 430 | 530 | 155 | — |
| Die "C" Tear Resistance, lb/in | 265 | 325 | 315 | 150 | — |

*Too weak for testing

EXAMPLES 13-16

Table III, Examples 13-16, reports data demonstrating the effect of blending an EO capped PPG triol polyether with an EO capped PPG diol polyether.

TABLE III

EFFECT OF BLENDING OF POLYOLS

| Composition | Examples | | | |
|---|---|---|---|---|
| | 13 | 14 | 15 | 16 |
| VORANOL ® 4702 (triol) | 100 | 75 | 60 | 50 |
| POLY G ® 55-112 (diol) | 0 | 25 | 40 | 50 |
| BDO | 7 | 7 | 7 | 7 |
| p-TMXDI | 27.8 | 32.2 | 34.9 | 36.6 |
| FOMREZ ® UL-28 | 0.2 | 0.2 | 0.2 | 0.2 |
| Physical Properties | | | | |
| Hardness A | 83 | 84 | 85 | 86 |
| Modulus, 100%, psi | 640 | 650 | 680 | 650 |
| Tensile Strength, psi | 1440 | 1780 | 1930 | 2160 |
| Elongation, % | 330 | 480 | 555 | 700 |
| Die "C" Tear Resistance, lb/in | 250 | 340 | 350 | 360 |

EXAMPLES 17-22

Table IV, Examples 17-22, reports data showing the effect of blending an EO capped PPG triol polyether with an EO capped PPG diol polyether.

TABLE IV

EFFECT OF BLENDING POLYOLS

| Composition | Examples | | | | | |
|---|---|---|---|---|---|---|
| | 17 | 18 | 19 | 20 | 21 | 22 |
| XUS 14003.01 (triol) | 100 | 70 | 60 | 50 | 40 | 0 |
| XAS 10887.01 (diol) | — | 30 | 40 | 50 | 60 | 100 |
| BDO | 5.5 | 5.5 | 5.5 | 5.5 | 5.5 | 5.5 |
| p-TMXDI | 23.4 | 23.1 | 23.1 | 22.9 | 22.8 | 22.3 |
| FOMREZ ® UL-28 | 0.3 | 0.3 | 0.3 | 0.3 | 0.3 | 0.3 |
| Physical Properties | | | | | | |
| Hardness A | 80 | 79 | 80 | 80 | 80 | 74 |
| Modulus, 100%, psi | 550 | 475 | 525 | 510 | 500 | — |
| Tensile Strength, psi | 820 | 1215 | 1450 | 1460 | 995 | 355 |
| Elongation, % | 250 | 445 | 485 | 530 | 435 | 40 |
| Die "C" Tear Resistance, lb/in | 220 | — | 250 | 250 | — | — |

EXAMPLES 23-28

Table V, Examples 23-28, reports data showing the effect of blending an EO capped PPG triol polyether with an EO capped PPG diol polyether.

TABLE V

EFFECT OF BLENDING OF POLYOLS

| Composition | Examples | | | | | |
|---|---|---|---|---|---|---|
| | 23 | 24 | 25 | 26 | 27 | 28 |
| XUS 14003.01 (triol) | 100 | 60 | 50 | 40 | 30 | 0 |
| XAS 10887.00 (diol) | — | 40 | 50 | 60 | 70 | 100 |
| BDO | 5.5 | 5.5 | 5.5 | 5.5 | 5.5 | 5.5 |
| p-TMXDI | 23.4 | 25.6 | 26.1 | 26.6 | 27.1 | 29.4 |
| FOMREZ ® UL-28 | 0.3 | 0.3 | 0.3 | 0.3 | 0.3 | 0.3 |

TABLE V-continued

EFFECT OF BLENDING POLYOLS

| Composition | Examples | | | | | |
|---|---|---|---|---|---|---|
| | 23 | 24 | 25 | 26 | 27 | 28 |
| Physical Properties | | | | | | |
| Hardness A | 80 | 82 | 81 | 81 | 93 | 79 |
| Modulus, 100%, psi | 550 | 540 | 525 | 490 | 525 | — |
| Tensile Strength, psi | 820 | 1480 | 1470 | 1620 | 1540 | 495 |
| Elongation, % | 250 | 480 | 480 | 815 | 895 | 100 |
| Die "C" Tear Resistance, lb/in | 20 | 225 | — | — | — | — |

EXAMPLES 29-31

Table VI, Examples 29-31, reports data demonstrating the effect of blending an EO capped PPG triol polyether with an EO capped PPG diol polyether.

TABLE VI

EFFECT OF BLENDING OF POLYOLS

| Composition | Examples | | |
|---|---|---|---|
| | 29 | 30 | 31 |
| VORANOL ® 5815 (triol) | 100 | 70 | 60 |
| XAS 10887.01 (diol) | — | 30 | 40 |
| BDO | 5 | 5 | 5 |
| FOMREZ ® UL-28 | 0.3 | 0.3 | 0.3 |
| p-TMXDI | 20.8 | 21.3 | 21.3 |
| Physical Properties | | | |
| Hardness A | 75 | 76 | 76 |
| Modulus, 100%, psi | 450 | 450 | 465 |
| Tensile Strength, psi | 1265 | 1420 | 1725 |
| Elongation, % | 460 | 575 | 720 |
| Die "C" Tear Resistance, lb/in. | 260 | 295 | 295 |

EXAMPLES 32-34

Table VII, Examples 32-34, reports data demonstrating the effect of blending an EO capped PPG triol polyether with an EO capped PPG diol polyether. The compositions containing the blends were prepared from a polyurethane prepolymer. The prepolymer was prepared from p-TMXDI and one of the polyethers used in the blend.

Prepolymer A

Prepolymer A was prepared by mixing:
(a) 400 g of XUS 14003.01 (triol); with
(b) 400 g of p-TMXDI; in the presence of
(c) 0.04 g of dibutyltin dilaurate (M&T catalyst T-12, a trademark of M&T Chemicals, Inc.)

at 85° C. for 4 hours. The prepolymer was found to have an isocyanate content of 14.6%.

Prepolymer B

Prepolymer B was prepared by mixing:
(a) 400 g of XAS 10887.01 (diol); with
(b) 400 g of p-TMXDI; in the presence of
(c) 0.04 g of dibutyltin dilaurate (M&T catalyst T-12, a trademark of M&T Chemicals, Inc.)

at 85° C. for 4 hours. The prepolymer was found to have an isocyanate content of 14.5%.

TABLE VII

EFFECT OF BLENDING POLYOLS

| Composition | Examples | | |
|---|---|---|---|
| | 32 | 33 | 34 |
| XUS 14003.01 (triol) | 25.4 | 50 | 50 |
| XAS 10887.01 (diol) | 50 | 25 | 50 |
| BDO | 5.5 | 5.5 | 5.5 |
| p-TMXDI | — | — | 23.5 |
| Prepolymer A | 49.2 | — | — |
| Prepolymer B | — | 50 | — |

TABLE VII-continued

EFFECT OF BLENDING POLYOLS

| Composition | Examples | | |
|---|---|---|---|
| | 32 | 33 | 34 |
| FOMREZ ® UL-28 | 0.3 | 0.3 | 0.3 |
| Physical Properties | | | |
| Hardness A | 79 | 80 | 81 |
| Modulus, 100%, psi | 610 | 635 | 510 |
| Tensile Strength, psi | 1715 | 1700 | 1460 |
| Elongation, % | 525 | 515 | 670 |
| Die "C" Tear Resistance, lb/in | 280 | — | — |

What is claimed is:

1. A reaction injection molding composition consisting essentially of:
   (a) an ethylene oxide-capped polypropylene glycol polyether having a number average equivalent weight of from about 400 to about 4,000 and having a functionality of from about 3.0 to about 5.0;
   (b) an ethylene oxide-capped polypropylene glycol polyether having a number average equivalent weight of from about 300 to 4,000; and having a functionality of about 2,0;
   wherein the weight ratio of (a) to (b) is from about 70:30 to about 30:70, respectively;
   (c) from about 2 to 20 parts by weight of a 1,4-butanediol chain extender, based on 100 parts by weight of (a) plus (b);
   (d) from about 0.001 to about 5.0 parts by weight of an organic tin compound catalyst, based on 100 parts by weight of (a) plus (b); and
   (e) an amount of para-tetramethylxylylene diisocyanate, or a polyurethane prepolymer having terminally reactive isocyanate groups and formed as a reaction product of a stoichiometric excess of para-tetramethylxylylene diisocyanate and a polymeric diol, to provide a stoichiometric index of NCO equivalents to OH equivalents in the overall composition of from about 0.95 to about 1.15.

2. A composition of claim 1 wherein said prepolymer has an isocyanate of from about 2.0 to about 9.0 wt % based on the weight of the prepolymer.

3. A composition of claim 1 wherein said catalyst is dimethyltin dilaurate.

4. A composition of claim 1 wherein the amount of said chain extender is from about 2 to about 10 parts by weight, based upon 100 parts by weight of (a) plus (b).

* * * * *